United States Patent [19]

Davis

[11] Patent Number: 4,949,529
[45] Date of Patent: Aug. 21, 1990

[54] VACUUM PACKAGE WITH SMOOTH SURFACE AND MTEHOD OF MAKING SAME

[75] Inventor: John S. Davis, New Hope, Pa.

[73] Assignee: Paramount Packaging Corporation, Chalfont, Pa.

[21] Appl. No.: 241,916

[22] Filed: Sep. 7, 1988

[51] Int. Cl.⁵ ............................................. B65D 30/08
[52] U.S. Cl. ........................................ 53/434; 53/411; 53/415; 206/525; 426/410
[58] Field of Search .................. 53/434, 449, 432, 415, 53/481, 411, 131; 426/410; 206/524.8, 525

[56] References Cited

U.S. PATENT DOCUMENTS

| | | | |
|---|---|---|---|
| 4,172,152 | 10/1979 | Carlisle | 53/434 X |
| 4,190,158 | 2/1980 | Ambrose | 53/434 X |
| 4,488,647 | 12/1984 | Davis | 206/525 |
| 4,667,453 | 5/1987 | Goglio | 426/410 X |
| 4,727,706 | 3/1988 | Beer | 53/434 |
| 4,734,292 | 3/1988 | Van Boxtel | 426/410 |

*Primary Examiner*—James F. Coan
*Attorney, Agent, or Firm*—Robert C. Podwil

[57] ABSTRACT

A vacuum package is made of flexible laminate capable of being stored as roll stock. The laminate comprises laminated inner and outer layers providing desired mechanical properties, secured together at patterned areas to facilitate the passage of gas between the layers, and is provided with a hand peelable sealing strip at an area which, when the laminate is formed into a bag and the mouth sealed, extends around the periphery of the mouth of the package. When the laminate is formed into a bag, the application of vacuum to the interior of the bag results in the inner layer conforming to the contours of the contents, while ambient air between the layers enables the outer layer to maintain a desirable and aesthetically pleasing smooth surface texture.

10 Claims, 3 Drawing Sheets

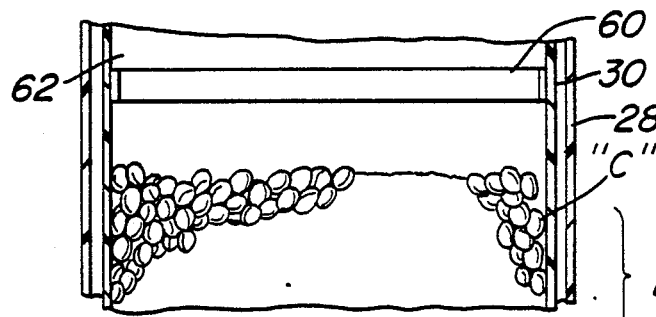
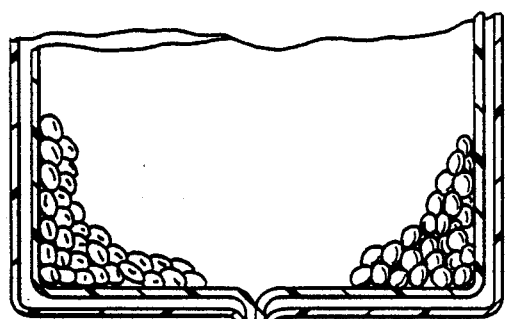
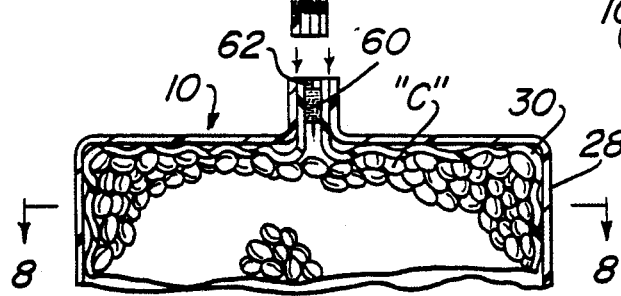
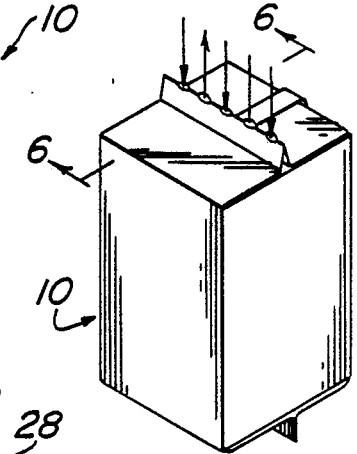
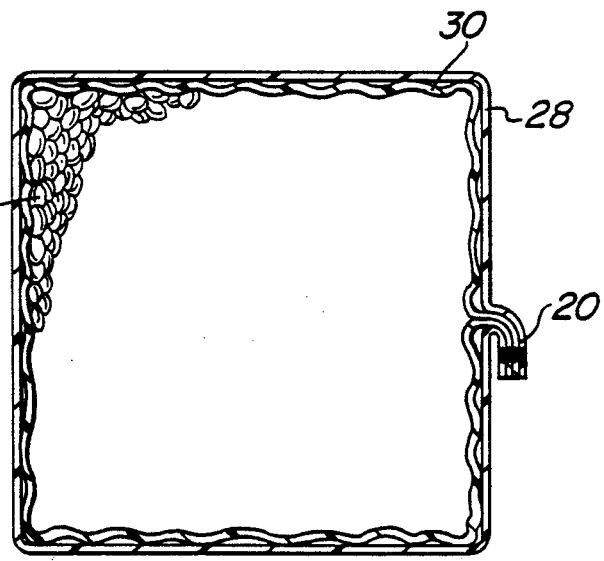
FIG. 6
FIG. 5
FIG. 7
FIG. 8

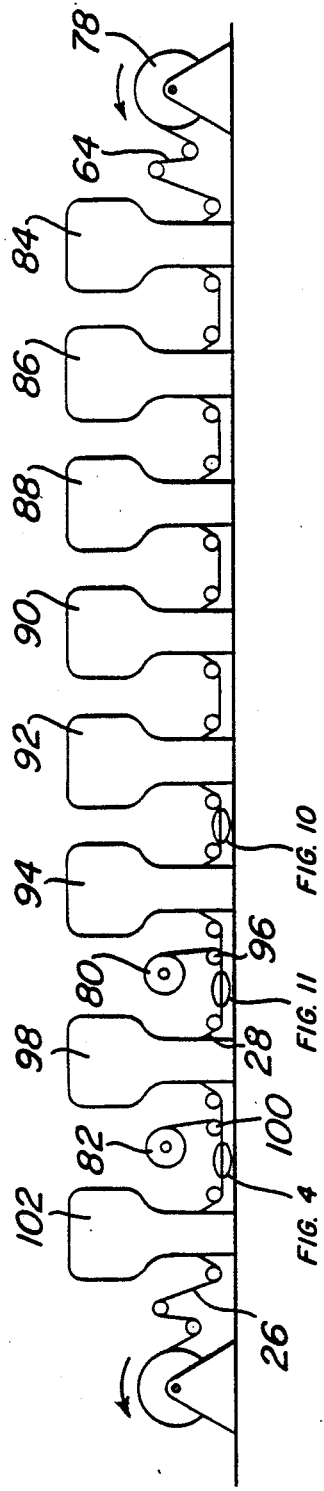

VACUUM PACKAGE WITH SMOOTH SURFACE AND MTEHOD OF MAKING SAME

BACKGROUND OF THE INVENTION

This invention relates to packages made from flexible film material, and more particularly, to bag-packages of kinds suitable for coffee and other foodstuffs which require gas or moisture protection and are commonly packaged under vacuum.

Certain products, such as coffee, have heretofore been marketed in flexible packages so-called "soft packs". One such kind of package consists of a bag constructed from a laminated film material of multiple plies, the material providing physical containment for the product as well as a moisture and gas barrier. Numerous film materials have been used, but typically, the materials include one or more plies for physical strength, dimensional stability, and gas and moisture barriers; a ply which is or can be printed upon to provide for labeling and other markings; and a ply which provides a sealant.

For some applications, it is advantageous to construct the film material and the package in an in-line process, by heat sealing the laminated material. The package may be filled and closed to produce a unit ready for shipping. Packages or bags of the above description may be used in vacuum packing, a familiar technique in which the contents are exposed to a reduced atmosphere during or just prior to a closing operation to draw off atmospheric air or other gases (which may contribute to spoilage) or to eliminate gases which might otherwise evolve or diffuse out of the packaged product over time. One such package is described in U.S. Pat. No. 4,488,647, issued Dec. 18, 1984, to John S. Davis, and assigned to the assignee of the present invention and application.

In instances in which the contents of the container are granular in character, such as most typically, ground coffee, the application of vacuum causes the film of the bag to conform to the surface of the material, and to thus take on a rough, grainy contour and appearance. In some circumstances, such an appearance is considered undesirable, and conventional practice has been to apply to the vacuum container a smooth over-wrap. Because the over-wrap, unlike the underlying bag, is not subjected to vacuum, the surface of the over-wrap has a smooth outer surface.

U.S. Pat. No. 4,734,292, issued Mar. 29, 1988, to Gerardus Van Boxtel, discloses a method of making a smooth-surfaced vacuum package in which the package includes inner and outer bags, separated by a gas space. The outer bag is made gas-impermeable and sealable, to isolate the gas space from the ambient atmosphere. In this apparatus and method, the inner bag is first heat sealed to seal the product within it under vacuum, and a gas is thereafter introduced into the space between the bags. The outer bag is made gas-impermeable, but the inner bag is made of a semipermeable material, so that the gas in the gas space and any gas eventually evolved from the product cause the wall of the outer bag to remain smooth.

Another method for forming a smooth-walled package is shown in U.S. Pat. No. 4,727,706, issued Mar. 1, 1988 to Jeffrey S. Beer.

SUMMARY OF THE INVENTION

The present invention relates to a vacuum package for granular materials which has a smooth outer surface. The package in accordance with the invention comprises a vacuum-tight bag made of a specially constructed flexible laminate, which provides an outer-wall layer and a gas impermeable inner wall layer, the inner and outer layers being laminated to each other at spaced areas which define spaces and passages to facilitate the flow of atmospheric gas between the wall layers. Vacuum sealing of the package, which is accomplished between the inner layers, leaves passages open to the flow of atmospheric air, and the presence of such air between the walled layers imparts to the outer wall layer the desired smooth surface texture.

One aspect of the present invention is a method of making from flexible material smooth-surfaced vacuum containers of the above-described kind, and provided with an easily-opened (hand peelable) seal of the kind described in U.S. Pat. No. 4,488,647, issued Dec. 18, 1984, to J. Davis, and assigned to the assignee of the present application. Another aspect of the invention is a method of making the laminated composite web from which smooth surfaced vacuum containers can be made.

A method in accordance with the present invention is practiced by making a flexible laminate having outer and inner wall layers of desired properties, the layers being laminated to each other at selected locations so as to facilitate the flow of atmospheric gas between them; forming the flexible laminate into a bag having an open mouth portion into which material can be placed in the bag and from which gas may be drawn; filling the bag; drawing a vacuum in the bag (which causes the inner wall layer to conform to the contour of the contents); and sealing the mouth of the bag by joining abutting areas of the inner layer by means of the easily opened seal. The resulting package, after sealing of its mouth, will have openings to the ambient air which enable the air to enter the passages and the space between the inner and outer layers.

The present invention lends itself to use of the technique described in the above-mentioned U.S. Pat. No. 4,488,647, in which the package is provided with a suitably strong seal, capable of being opened by hand manipulation and adaptable to in-line bag-manufacturing processes in which the laminate is provided as roll stock.

In yet another of its aspects, the present invention relates to a laminate for making smooth-surfaced vacuum packages, in which inner and outer wall layers having desired strength, gas and moisture impermeability, sealability and aesthetic qualities, are joined together at selected locations to provide, when the laminate is fabricated into a bag, a double-walled package, capable of retaining a vacuum while presenting a smooth and aesthetically acceptable and pleasing outer surface and providing a hand-peelable seal.

There are shown in the drawings, by way of example, a presently preferred embodiment of the invention, although it should be understood that the invention is not limited to the precise arrangements and instrumentalities described and shown.

BRIEF DESCRIPTION OF THE DRAWINGS

FIG. 5 is a perspective view of a package which employs the present invention, illustrating diagrammatically the manner in which ambient air can create a smooth surface for the package.

FIG. 6 is a cross-sectional view taken along the line 6—6 in FIG. 5.

FIG. 7 is a partial cross-sectional view of a package in accordance with the invention.

FIG. 8 is a cross-sectional view taken along the line 8—8 in FIG. 7.

FIG. 9 is a diagrammatic view, showing a series of steps whereby roll stock materials may be used to produce a laminate in accordance with the present invention, which may itself be provided as a roll stock.

FIG. 10 is a cross-sectional view showing the condition of a layer of the laminate at a certain position identified in FIG. 9.

FIG. 11 is a partial cross-sectional view showing the condition of a layer of the, laminate at another position identified in FIG. 9.

FIG. 12 is a partial cross-sectional view showing the condition of another layer of the laminate at another position identified in FIG. 9.

FIG. 12a is a partial cross-sectional view like that of FIG. 12, but showing a modified form of the other layer.

DETAILED DESCRIPTION

Figure 1:
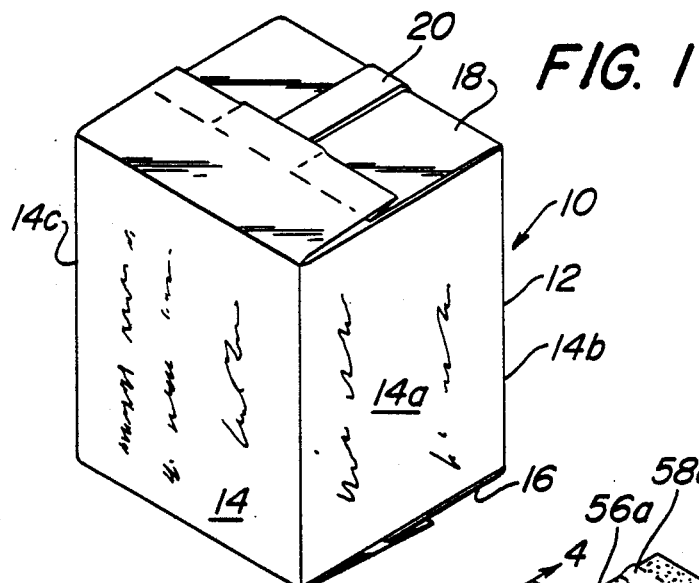
FIG. 1 is a perspective view of a finished package, made in accordance with the present invention.

Packages in accordance with the present invention are made from flexible material of laminated construction. Referring now to the drawings in detail, wherein like reference numerals indicate like elements, there is seen in FIG. 1 a package designated generally by the reference numeral 10. The package 10 is a typical square-bottomed bag, comprising a body member 12 having respective side walls 14, 14a, 14b and 14c, a bottom wall 16 and a top wall 18. The package 10 is made of a flexible laminate, to be described below, by means of conventional folding and gusseting techniques. The back seam 20 and bottom seam 24 are strong and permanently welded, and preferably made using conventional heat sealing techniques.

Figure 2:
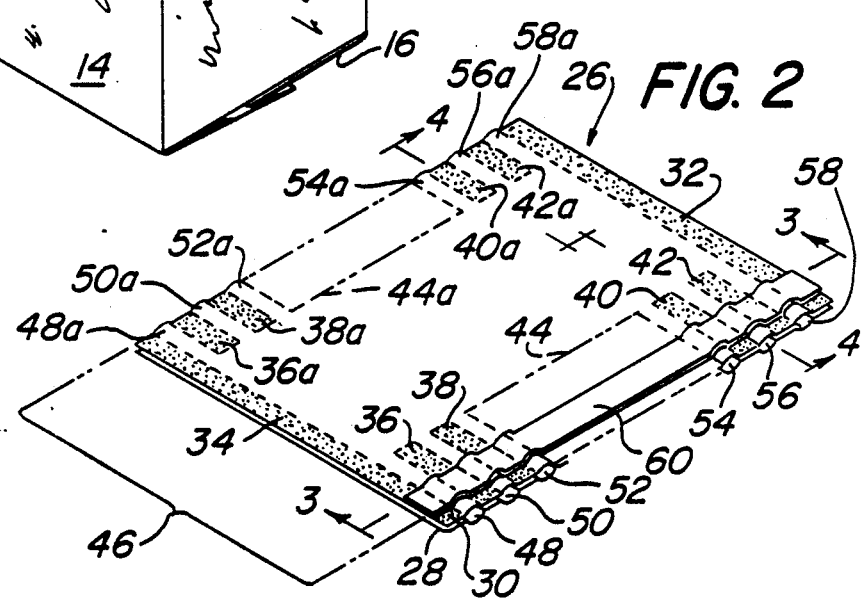
FIG. 2 is a cross-sectional view of a web of a laminate used in the present invention.

Referring now to FIG. 2, there is seen a laminated web, designated generally by the reference numeral 26, of flexible material from which a package, like the package 10, may be made in accordance with the invention.

The web 26 in FIG. 2 is a two-layer laminate, the layers being designated, respectively, by the reference numerals 28 and 30. For the purposes of illustration in FIG. 2, and also in FIGS. 3 and 4, the layers 28 and 30 are depicted for simplicity as unitary layers. It should be understood, however, that the layers 28 and 30 are themselves laminated in the manner described below, to provide desirable functional and aesthetic properties.

Referring again to FIG. 2, the web 26 is made as a continuous web, the layers 28 and 30 of which are laminated in-line to form the illustrated laminated web 26.

The laminated web 26 includes at its lateral edges continuously bonded portions 32 and 34, which, when the web is formed into a package (like the package 10), are preferably incorporated into and form the back seam 20.

Disposed across the width of the web 26 are additional bonded portions 36, 38, 40 and 42, by way of example. A dotted line, designated by the reference numeral 44, indicates symbolically that bonded portions such as these are preferably disposed across the width of the web 26.

Bonded portions 36(a)-44(a) are also disposed widthwise with respect to the web, and are spaced from the bonded portions 36-44 by a selected spacing or period related to the height of the package 10 to be made from the web 26. Thus, the bonded portions 36-42 are spaced from the bonded portions 36(a)-44(a) by a web-wise distance or period 46. The length of the period 46 is determined by the height of the desired package 10 as will be apparent below.

Figure 3:
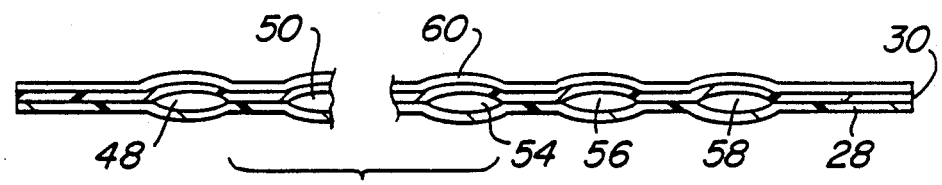
FIG. 3 is a cross-sectional view taken along the line 3—3 in FIG. 2.
Figure 4:
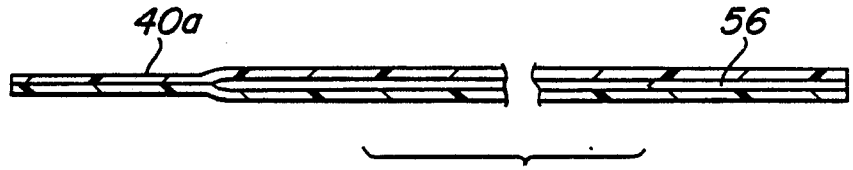
FIG. 4 is a partial cross-sectional view taken along the line 4—4 in FIG. 2 and also showing the condition of the laminated web at a certain position identified in FIG. 9.

As is perhaps best seen in FIGS. 3 and 4 the areas of the layers 28 and 30 between the above-described bonded portions are not bonded together, but rather, define passages or open areas between the layers 28 and 30.

More specifically, the spaces between the bonded portions 32, 34 define passages of which passages 48–58 and 48(a)-58(a) are seen in FIG. 2. The passages 48–58 are also seen in cross-section in FIG. 3. It should now be apparent that the web 26 may be made continuously, with continuous bonded portions 32 and 34 at its edges and the periodically spaced bonded portions like the bonded portions 36–44.

Applied to one face of the web 26 periodically, at a spacing corresponding to the period 46 (that is, once for each repetition) of the bonded portions (e.g. 36–44) is a layer or coating of seal-forming material designated by the reference numeral 60. The material 60 is preferably of the hand-peelable type as described in the above-mentioned patent to Davis.

FIGS. 5 through 8 illustrate the manner in which a package 10 may be made in accordance with the invention.

In FIG. 6, the package 10 is seen in vertical cross-section, after filling but before the application of vacuum. Non-bonded areas are seen as spaces, somewhat exaggerated dimensionally, between the layers 28 and 30.

FIG. 7 illustrates the manner in which, with the drawing of a vacuum from within the package 10, the inner layer, here represented by the reference numeral 30, conforms to the contours of the contents "C" of the package 10. The mouth of the package 10, designated by the reference numeral 62, is sealed, using conventional folding techniques, after the drawing of a vacuum, by heat sealing juxtaposed areas of the inner layer 30. The seal strip 60 extends around the inner periphery of the mouth 62 in the manner best seen in FIG. 6. Heat sealing in this manner between juxtaposed areas of the inner layer 30 serves to close the mouth 62 without sealing the layer 28 to the layer 30 in the area of the mouth 62. In other words, as is apparent from FIG. 5, although the mouth 62 of the package 10 is closed (and the contents thus maintained under vacuum), the passages 48–58 remain open to the atmosphere. Free passage of atmospheric air between the layers 28 and 30 (depicted symbolically by arrows in FIGS. 5 and 7), relieves the outer layer 28 of the differential pressure created by the vacuum within the package 10 (and sensible across the inner layer 30), and enables the layer 28 to relax to a smooth condition, thus creating a package presenting the desired smooth outer surface.

The layers 28 and 30 of the web 26 are themselves of laminated construction. Referring now to FIG. 11, one practical form of the web utilizes as its outer layer a two-ply structure consisting of plies 64 and 66. In this example, the ply 64 is made up of 48 ga. polyester, reverse printed as indicated (dimensionally exaggerated) at 68, preferably in a series of gravure printing operations. The reverse-printed ply 64 is seen in cross-section in FIG. 10. Referring now to FIG. 11, the ply 66 consists in a presently preferred form of the invention of twenty-six (26) pound paper, clay-coated to retain adhesive as needed. The two-ply laminate 64, 66, which provides in the package 10 the outer layer 28, may in turn be laminated to a layer 30, seen in FIG. 12, which preferably consists of a ply 70 of 48 ga. metalized polyester laminated to a ply 72 of 60 ga. (6090) nylon. The ply 72 is laminated to a sealant ply 74, preferably a film of linear low density Polyethylene (such as the product known as "Sclair", sold by E. I. DuPont de Nemours Co.). The sealant ply 74 is typically o a thickness of about 3 mils. Other specific materials and dimensions may be used.

An alternative for the above-described layer 30, illustrated in FIG. 12a, comprises a foil layer 76, laminated to a ply 72' of 6090 nylon, laminated in turn to a sealant ply 74' as mentioned above.

Referring now to FIG. 9, an in-line process by which the laminated web 26 may be made is illustrated.

In this regard, there are seen in FIG. 9 supply rolls 78, 80 and 82, which provide webs of material for the various plies.

The supply roll 78, seen at the right in FIG. 9, provides the polyester ply 64. The ply 64 passes through a series of printing stations, such as the stations 84-92, which apply by gravure or other suitable techniques the desired reverse printing 68. The station 94 is a coating station, at which an overall coating of adhesive is applied to the ply 64. The printed ply 64 is then laminated at a roller 96 to the paper ply 66 (supplied from the roll 80). At station 98, a pattern coating is applied to the outer layer 28 (combined plies 64 and 66), to prepare that layer for spot lamination (as described above), at a roller 100, to the layer 30 (or, as the case may be, 30'). The supply roll 82 supplies the web constituting the layer 30 (or 30').

At the station 102, the seal material 60 is applied to the sealant side of the composite web 26, in registry with the pattern coating and printed matter on the outer face of the composite web 26, but on the face of the web 26 (the sealant ply 70) which will ultimately be the inner face of the mouth 62 of the 10 package. The seal material is then dried, and the completed web 26 taken up on the take-up roll 104.

The present invention may be embodied in other specific forms without departing from his spirit or essential attributes. Accordingly, reference should be made to the appended claims rather than the foregoing specification as an indication of the scope of the invention.

I claim:

1. A method of making from a web of material flexible packages of the kind having closed wall portions, an open mouth portion and a hand peelable seal, and characterized by a smooth outer surface, comprising the steps of providing a first running web of flexible material; printing on said material a repetitive pattern; laminating the printed web to a second running web to form a first packaging layer; providing as a second packaging layer a running web of gas-impermeable material; laminating said first layer to said second layer at spaced locations thereon so as to form a composite laminate in which said first and said second layers have spaces therebetween to facilitate the flow therebetween of atmospheric gases; printing on one face of the second packaging layer in a direction across the width of the webs and in registry with each repetition of the pattern on the printed web a seal strip of heat fusible plastic polymeric material adapted to form the hand-peelable seal; and gathering and storing the finished web on a take-up roll; and removing and selectively severing the web to form individual bags having hand peelable seals.

2. A method in accordance with claim 1, wherein the first running web is of transparent polyester, and the printing step is performed by printing on the reverse side of the polyester.

3. A method in accordance with claim 1, wherein the second packaging layer comprises a lamination of metalized polyester, nylon and polyethylene.

4. A method in accordance with claim 1, wherein the second packaging layer comprises a lamination of nylon, foil and polyethylene.

5. A method in accordance with claim 4, wherein the first running web is of transparent material and the printing step is performed by printing on the reverse side of the polyester.

6. A vacuum tight bag for granular materials characterized by a smooth outer surface and having closed wall portions and an open mouth portion, comprising: a flexible laminate having an outer wall layer and a gas-impermeable inner wall layer, said inner and said outer wall layers being laminated to each other at spaced areas thereon, said spaced areas defining therebetween and between said inner and said outer layers passages facilitating the flow of atmospheric gas between said wall layers, a repetitive printed pattern on said outer wall layer and heat fusible plastic polymeric seal strips printed on said inner wall layer extending across said web and adapted to close the mouth portion of the bag, said seal strips being of a strength when operative sufficient to retain vacuum within said bag but capable of begin broken by hand manipulation and joining juxtaposed areas of the inner wall layer, said seal strips being printed on said web in registry with said pattern, so that said web may be stored on a roll and selectively severed to form individual bags having hand peelable seals.

7. A package in accordance with claim 6, wherein said inner wall layer comprises a lamination of respective layers of nylon, foil and polyethylene.

8. A package in accordance with claim 7, wherein said outer wall layer comprises a lamination of respective layers of reverse-printed polyester and paper.

9. A package in accordance with claim 6, wherein said inner wall layer comprises a lamination of respective layers of metallized polyester, nylon and polyethylene.

10. A package in accordance with claim 9, wherein said outer wall layer comprises a lamination of respective layers of reverse-printed polyester and paper.

* * * * *